United States Patent
Shibukawa et al.

(10) Patent No.: US 8,714,656 B2
(45) Date of Patent: May 6, 2014

(54) TRAVEL DRIVE DEVICE FOR DUMP TRUCK

(75) Inventors: Takeshi Shibukawa, Abiko (JP); Naoyuki Inoue, Tsuchiura (JP); Kyoko Tanaka, Namegata (JP); Shinichiro Hagihara, Tsuchiura (JP); Takeshi Shinohara, Omitama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/547,591

(22) Filed: Jul. 12, 2012

(65) Prior Publication Data

US 2013/0062926 A1    Mar. 14, 2013

(30) Foreign Application Priority Data

Sep. 12, 2011 (JP) ................. 2011-198480

(51) Int. Cl.
*B60P 1/00* (2006.01)
(52) U.S. Cl.
USPC ........................................ 298/17 R
(58) Field of Classification Search
USPC ......... 298/7, 17 R, 19 R, 17 S; 475/159, 160; 180/371, 372, 385; 192/48.5, 70.2
See application file for complete search history.

(56) References Cited

U.S. PATENT DOCUMENTS

| | | | |
|---|---|---|---|
| 2,763,160 | A | 9/1956 | Buckendale |
| 4,334,590 | A | 6/1982 | Plumb |
| 2003/0193234 | A1 * | 10/2003 | Baker et al. ................. 298/17 R |

FOREIGN PATENT DOCUMENTS

| | | |
|---|---|---|
| EP | 2213497 A1 | 8/2010 |
| JP | 2009-204016 A | 9/2009 |
| JP | 2010-116963 A | 5/2010 |
| WO | 03066359 A2 | 8/2003 |

* cited by examiner

Primary Examiner — Stephen Gordon
(74) Attorney, Agent, or Firm — Mattingly & Malur, PC

(57) ABSTRACT

There are provided an axle housing, a rotational shaft provided to axially extend in a spindle of the axle housing, a wheel mounting cylinder which is mounted on an outer peripheral side of the spindle through wheel support bearings and to which wheels are mounted, and a planetary gear reduction mechanism for decelerating rotation of the rotational shaft, which is transmitted to the wheel mounting cylinder. A carrier forming a part of the planetary gear reduction mechanism is mounted in a non-rotating state on an open end side of the spindle. A cylindrical coupling member is provided between the spindle and the carrier, and provided with an axial one side outer periphery splined-coupled to an open end inner peripheral side of the spindle and an axial other side outer periphery spline-coupled to an inner peripheral side of the carrier.

15 Claims, 9 Drawing Sheets

TRAVEL DRIVE DEVICE FOR DUMP TRUCK

TECHNICAL FIELD

The present invention relates to a travel drive device for a dump truck which is suitably used in transporting crushed stones excavated from such as an open-pit stope, a stone quarry, a mine or the like.

BACKGROUND ART

In general, a large-sized transporter vehicle called a dump truck has a liftable vessel (loading platform) on a frame of a vehicle body, and transports crushed stones or the like in a state of a heavy baggage being loaded in a large quantity on the vessel.

Therefore, each travel drive device for driving drive wheels of the dump truck for traveling is provided with an axle housing mounted in a non-rotating state on a vehicle body and having a tip end side opened to form a cylindrical spindle, a rotational shaft provided to axially extend in the spindle of the axle housing and driven and rotated by a drive source, a wheel mounting cylinder which is rotatably mounted on an outer peripheral side of the spindle through a wheel support bearings and to which wheels are mounted, and a reduction gear mechanism provided between the wheel mounting cylinder and the spindle to decelerate rotation of the rotational shaft, which is transmitted to the wheel mounting cylinder (Patent Documents 1 and 2).

The reduction gear mechanism is constituted by a multi-stage planetary gear reduction mechanism comprising a sun gear, a plurality of planetary gears meshing with the sun gear and a ring-shaped internal gear, and a carrier rotatably supporting the respective planetary gears through support pins. The carrier forming a part of a final-stage planetary gear reduction mechanism is configured to be mounted in a non-rotating state on an open end side of the spindle.

PRIOR ART DOCUMENTS

Patent Documents

Patent Document 1: Japanese Patent Laid-Open No. 2009-204016 A
Patent Document 2: Japanese Patent Laid-Open No. 2010-116963 A

SUMMARY OF THE INVENTION

Incidentally, according to the travel drive device for the dump truck according to the aforementioned conventional art, since the carrier used for the final-stage planetary gear reduction mechanism is mounted in a non-rotating state on the open end side of the spindle, the carrier and the spindle are coupled by a spline-coupling portion formed of male spline and female spline. However, this spline-coupling portion does not necessarily have sufficient strength in a case where a loading weight of the dump truck is increased to, for example, 250 tons or more, and a further improvement is needed.

That is, for enhancing the strength of the spline-coupling portion following a growing size of the travel drive device, there may be a measure of increasing a diameter as an outer diameter dimension or a tooth width (axial length of the spline tooth) of the spline-coupling portion. It is possible to receive and bear a rotational load of large torque with the spline-coupling portion by adopting this measure. However, it is required for the travel drive device to be made as small in size as possible, and there is a limitation to increasing the diameter of the spline-coupling portion. Therefore, it is practical to increase the tooth width as the axial length of the spline tooth as large as possible, thereby reducing a load of each spline tooth per unit length.

However, when the axial dimension (tooth width) of the spline-coupling portion is increased, partial contact in tooth flank between the spline teeth meshing with each other tends to be made by an inclination or torsion of the shaft caused by a rotational load from an outside, which will become the cause of damage of each spline tooth. Therefore, for preventing the partial contact between the spline teeth and making the tooth contact therebetween uniform, there is known a method of executing a modification process of a tooth flank called crowning or relieving in a case of molding the spline tooth.

On the other hand, the final-stage carrier used in the conventional art is provided to be integral with a cylindrical projecting section on an outer peripheral surface of which male spline is formed. The cylindrical projecting section of the carrier has an outer peripheral side spline-coupled to an open end inner peripheral side of the spindle. However, the following problem as follows occurs in a case where the cylindrical projecting section is formed to be integral with the carrier as a heavy object and the male spline is molded on the outer peripheral surface of the cylindrical projecting section. That is, it is difficult to execute then modification process called crowning or relieving as described above for making the tooth contact between the spline teeth uniform, which needs hours and labors. Therefore, there occurs the problem that it is required to prepare particularly large, exclusive equipment and it is not practical.

In view of the above-discussed problem with the conventional art, it is an object of the present invention to provide a travel drive device for a dump truck which can enhance the strength of a spline-coupling portion provided between an open end side of a spindle and a carrier to a rotational load without increasing a diameter of the spline-coupling portion to improve durability and lifetime of an entire device.

(1) In order to solve the aforementioned problem, the present invention is applied to a travel drive device for a dump truck comprising an axle housing mounted in a non-rotating state on a vehicle body of a dump truck and having an end side opened to form a cylindrical spindle; a rotational shaft provided to axially extend in the spindle of the axle housing and driven and rotated by a drive source; a wheel mounting cylinder which is rotatably provided on an outer peripheral side of the spindle through wheel support bearings and to which wheels are mounted; and a planetary gear reduction mechanism provided between the wheel mounting cylinder and the spindle to decelerate rotation of the rotational shaft, which is transmitted to the wheel mounting cylinder; wherein a carrier forming a part of the planetary gear reduction mechanism and rotatably supporting a plurality of planetary gears through support pins is mounted in a non-rotating state on an open end side of the spindle.

The characteristic of the construction adopted in the present invention lies in that a cylindrical coupling member, which is formed as a cylindrical body made up of an independent member and in an inner peripheral side of which the rotational shaft is inserted, is provided between the spindle and the carrier, the cylindrical coupling member having an axial one side outer periphery spline-coupled to an open end inner peripheral side of the spindle and an axial other side outer periphery spline-coupled to an inner peripheral side of the carrier.

With this arrangement, unlike the carrier used in the conventional art, it is not required to provide the cylindrical projecting section having the male splines on the outer peripheral side integrally with the carrier, making it possible to simplify the configuration of the carrier. In addition, since the cylindrical coupling member made up of the independent member can be formed in a simple shape. Therefore, when the male spline is molded on the outer peripheral side, it is easy to execute the modification process of the tooth flank called crowning or relieving, for example.

On the other hand, it is possible to enhance the strength of the spline-coupling portion to the rotational load without increasing the diameter thereof. In addition, the tooth width as the axial length of the spline tooth can be made as long as possible to relieve the load of each spline tooth per unit length. Further, even when the inclination or torsion of the shaft is generated in the cylindrical coupling member due to the rotational load from an outside, the partial contact in the tooth flank between the spline teeth meshing with each other can be prevented by executing the modification process of the tooth flank as described above, thus making the tooth contact therebetween uniform.

(2) According to the present invention, a female spline is provided on the open end inner peripheral side of the spindle and other female spline is provided on the inner peripheral side of the carrier, and a first male spline positioned at an axial one side thereof to be spline-coupled to the female spline of the spindle and a second male spline positioned in an axial other side thereof to be spline-coupled to the other female spline of the carrier are provided on an outer peripheral side of the cylindrical coupling member. With this arrangement, the cylindrical coupling member can spline-couple the first male spline to the female spline of the spindle, and can spline-couple the second male spline to the other female spline of the carrier.

(3) According to the present invention, an annular step portion is provided on an outer peripheral side of the cylindrical coupling member over an entire circumference, an end retainer is provided on an open side end surface of the spindle to position the wheel support bearing for rotatably supporting the wheel mounting cylinder on an outer peripheral side of the spindle, and a retaining portion is provided on an inner peripheral side of the end retainer to make contact with the step portion of the cylindrical coupling member for performing a retaining operation of preventing the cylindrical coupling member from pulling out of the spindle. With this arrangement, the retaining portion of the end retainer for positioning the wheel support bearing on the open side end surface of the spindle can make contact with the step portion and the cylindrical coupling member can be mounted on the open end side of the spindle in a retaining state.

(4) According to the present invention, the first male spline positioned in an axial one side and spline-coupled to the spindle, the second male spline positioned in an axial other side and spline-coupled to the carrier to be formed with a diameter smaller than that of the first male spline, and an annular step portion positioned between the first and second male splines to extend in a circumferential direction, are provided on an outer peripheral side of the cylindrical coupling member, an end retainer is provided on an open side end surface of the spindle to position the wheel support bearing for rotatably supporting the wheel mounting cylinder on an outer peripheral side of the spindle, and a retaining portion is provided on an inner peripheral side of the end retainer to make contact with the step portion of the cylindrical coupling member for performing a retaining operation of preventing the cylindrical coupling member from pulling out of the spindle.

(5) According to the present invention, the end retainer is provided with an oil passage which is positioned between the end retainer and the open side end surface of the spindle and extends from a radial outside to a radial inside, introducing a part of lubricant oil supplied to the planetary gear reduction mechanism to the male splines. With this arrangement, the oil passage formed in the end retainer can introduce a part of lubricant oil supplied to the planetary gear reduction mechanism to the outer peripheral side of the cylindrical coupling member and lubricate the male spline, thus preventing lack of the lubricant oil in the spline-coupling portion.

(6) According to the present invention, the cylindrical coupling member is provided with a lubricant oil guide for guiding the lubricant oil introduced through the oil passage toward the first male spline. With this arrangement, the lubricant oil introduced through the oil passage formed in the end retainer can be guided toward the first male spline having a larger outer diameter dimension out of the first and second male splines and can lubricate the first male spline side.

(7) According to the present invention, a rotational shaft bearing rotatably supporting an axial intermediate section of the rotational shaft on an inner race and a bearing retainer supporting an outer race of the rotational shaft bearing to an inner peripheral side of the spindle in a fixing manner are provided inside the spindle, and the bearing retainer is provided with a positioning projection to project toward an end surface of the cylindrical coupling member in an axial one side and make contact with the end surface, thus axially positioning the cylindrical coupling member inside the spindle. With this arrangement, the cylindrical coupling member can be axially positioned inside the spindle by making the positioning projection be in contact with the end surface of the cylindrical coupling member.

(8) According to the present invention, the cylindrical coupling member has 300 mm or more of a diameter of the spline, and a ratio of a diameter to a tooth width of the spline set in a range of $$1 < \frac{\text{diameter}}{\text{tooth width}} < 2.5.$$

With this arrangement, even in a case of a large-sized travel drive device in which the diameter of the spline as the outer diameter dimension of the cylindrical coupling member is 300 mm or more, the tooth width as the axial length of the spline can be made as long as possible to relieve the load of each spline tooth per unit length.

(9) According to the present invention, a spline-coupling portion between the cylindrical coupling member and the spindle and a spline-coupling portion between the cylindrical coupling member and the carrier are configured such that each tooth flank is subjected to a crowning or relieving process to make a tooth contact of each tooth flank uniform in an entire tooth width. With this arrangement, even in a case where the inclination or torsion of the shaft is generated in the cylindrical coupling member due to the rotational load from an outside, the partial contact in the tooth flank between the spline teeth meshing with each other can be prevented to make a tooth contact of each tooth flank uniform in an entire tooth width.

(10) According to the present invention, the cylindrical coupling member has 300 mm or more of a diameter of the spindle, and a ratio of a diameter to a tooth width of the spline set in a range of $$1 < \frac{\text{diameter}}{\text{tooth width}} < 2.5,$$

and a spline-coupling portion between the cylindrical coupling member and the spindle and a spline-coupling portion between the cylindrical coupling member and the carrier are configured such that each tooth flank is subjected to a crowning or relieving process to make a tooth contact of each tooth flank uniform in an entire tooth width.

MODE FOR CARRYING OUT THE INVENTION

Hereinafter, a travel drive device for a dump truck according to embodiments of the present invention will be in detail explained with reference to the accompanying drawings of FIG. 1 to FIG. 10 by taking a dump truck of a rear-wheel drive type as an example.

Figure 1:
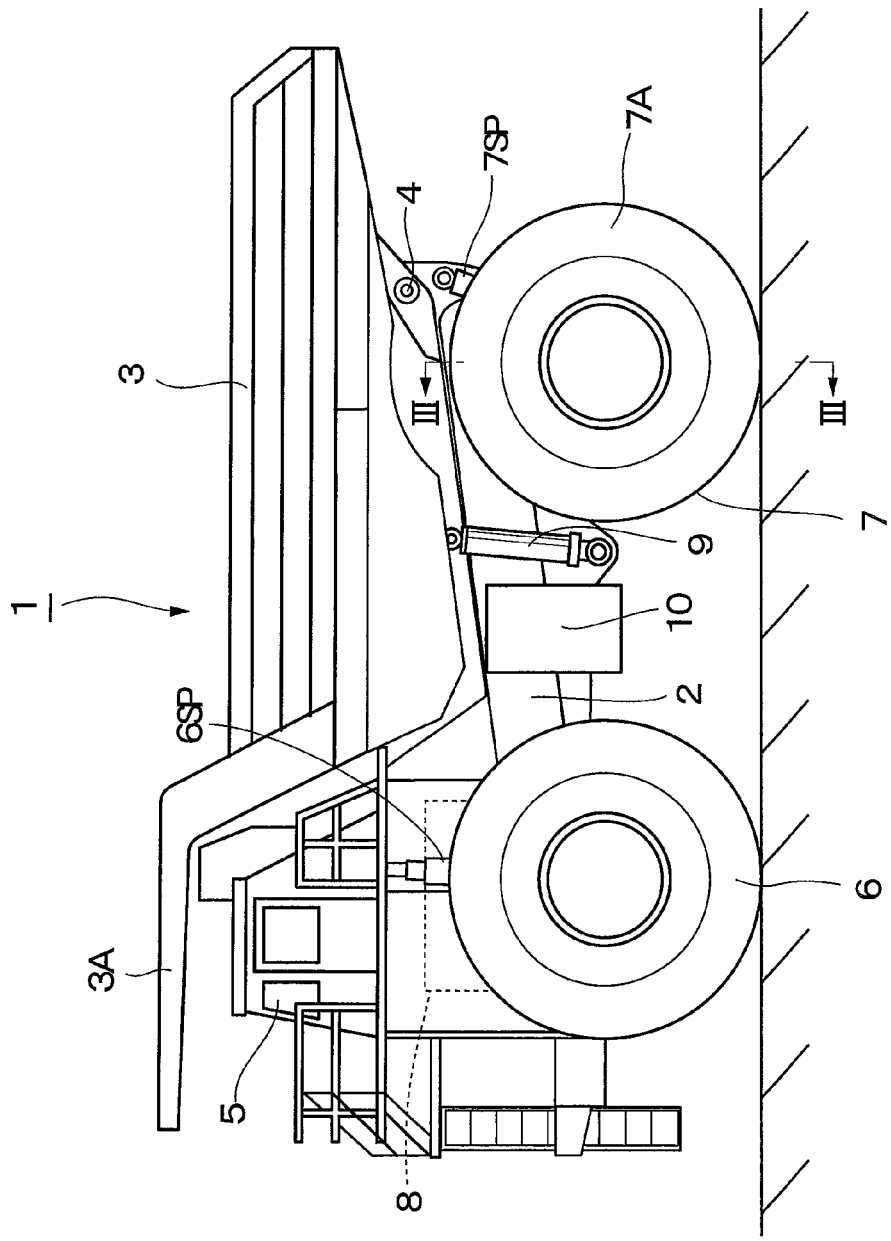
FIG. 1 is a side view showing a dump truck to which a travel drive device according to a first embodiment of the present invention is applied.

In the figure, designated at 1 is a dump truck of a large-sized transporter vehicle adopted in the present embodiment. As shown in FIG. 1, the dump truck 1 is constituted by including a vehicle body 2 having a strong frame structure and a vessel 3 as a loading platform liftably mounted on the vehicle body 2.

The vessel 3 is formed, for example, as a large-sized container of an entire length of 9 to 13 meters for loading a large volume of a heavy baggage such as crushed stones. A rear-side bottom portion of the vessel 3 is liftably (tiltably) connected to a rear end side of the vehicle body 2 through a connecting pin 4. A protector 3A is integrally provided in a front-side top portion of the vessel 3 in such a manner as to cover a cab 5 to be described later from the upper side.

The cab 5 is provided in the front portion of the vehicle body 2 to be positioned under the protector 3A. The cab 5 forms an operator's room which an operator of the dump truck 1 gets in and off. An operator's seat, an activation switch, an accelerator pedal, a brake pedal, a handle for steering, and a plurality of operating levers (any of them is not shown) are provided inside the operator's room. The protector 3A of the vessel 3 has functions of protecting the cab 5 from flying stones such as rocks by substantially completely covering the cab 5 from the upper side, and protecting an operator inside the cab 5 at the falling-down of a vehicle (dump truck 1).

Left and right front wheels 6 are rotatably provided on the front side of the vehicle body 2. Each front wheel 6 forms part of a steered wheel which is steered by an operator of the dump truck 1. Further, the front wheel 6 is formed in a tire diameter (outer diameter dimension), for example, as long as 3 to 4 meters in the same way as each of rear wheels 7 to be described later. A front-wheel side suspension 6SP formed by a hydraulic shock absorber is provided between the front portion of the vehicle body 2 and the front wheel 6.

Figure 3:
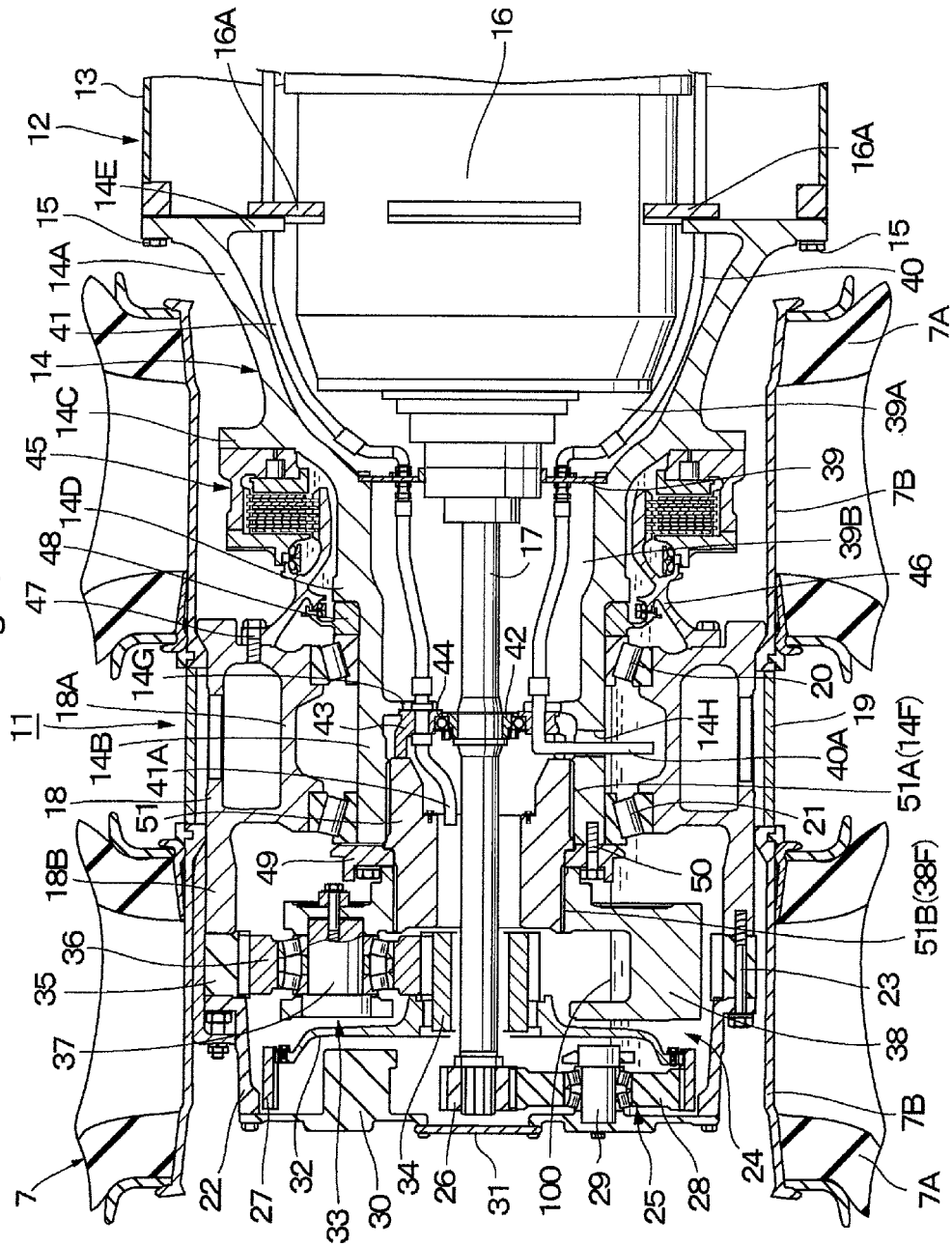
FIG. 3 is an enlarged cross-sectional view showing the travel drive device in the rear wheel side, taken in the direction of the arrows in FIG. 1.

The left and right rear wheels 7 are rotatably provided on the rear side of the vehicle body 2. Each rear wheel 7 forms a drive wheel of the dump truck 1 which is driven and rotated integrally with a wheel mounting cylinder 18 by a travel drive device 11 to be described later as shown in FIG. 3. Each rear wheel 7 is constituted by including dual tires of an inner tire 7A and an outer tire 7A, and rims 7B disposed in a radial inside of the respective tires 7A. A rear-wheel side suspension 7SP formed by a hydraulic shock absorber is provided between the rear portion of the vehicle body 2 and the rear wheel 7.

An engine 8 is provided in the vehicle body 2 to be positioned under the cab 5. The engine 8 is constituted by, for example, a large-sized diesel engine and drives an on-board power generator and a hydraulic pump as a hydraulic source (any thereof is not shown) for rotation. Pressurized oil discharged from the hydraulic pump is supplied to hoist cylinders 9, a steering cylinder for power steering (not shown) and the like.

The hoist cylinder 9 is a cylinder apparatus for lifting the vessel 3. The hoist cylinder 9 is positioned between the front wheel 6 and the rear wheel 7 to be disposed in each of both left and right sides of the vehicle body 2. Each of the hoist cylinders 9 is mounted between the vehicle body 2 and the vessel 3 to telescopically operate in the upper-lower direction. Each of the hoist cylinders 9 expands and contracts in the upper-lower direction by supply/discharge of the pressurized oil from/to the hydraulic pump to lift (tilt) the vessel 3 around the connecting pin 4 of the rear side.

As shown in FIG. 1, an operating oil tank 10 is mounted to a side of the vehicle body 2 or the like to be positioned under the vessel 3. Operating oil accommodated in the operating oil tank 10 is suctioned by the hydraulic pump and discharged therefrom to be pressurized oil, which is supplied/discharged to/from the hoist cylinder 9, the steering cylinder for power steering, and the like.

Next, an explanation will be made of the travel drive device 11 which is provided to the side of the rear wheel 7 in the dump truck 1 and forms a key part of the present embodiment.

The travel drive device 11 is constituted by including an axle housing 12, a wheel drive motor 16, a wheel mounting cylinder 18 and a reduction gear mechanism 24, which will be described later. The travel drive device 11 decelerates rotation of the wheel drive motor 16 by the reduction gear mechanism 24 and drives the rear wheels 7 as drive wheels of vehicle together with the wheel mounting cylinder 18 by large rotational torque for traveling.

Designated at 12 is the axle housing for the rear wheel 7, which is provided under the rear side of the vehicle body 2 and the axle housing 12 is formed in a cylindrical body which axially extends between the left and right rear wheels 7. The axle housing 12 is constituted by an intermediate cylindrical body 13 mounted to the rear side of the vehicle body 2 through the rear-wheel side suspension 7SP and a spindle 14 mounted to each of both left and right sides of the cylindrical body 13, which will be described later.

The spindles 14 are provided respectively at axial both sides of the axle housing 12 and each spindle 14 is formed in a cylindrical body. As shown in FIG. 3, the spindle 14 is constituted by including a large-diameter cylindrical portion 14A positioned at an axial one side, formed to be tapered and removably fixed to the cylindrical body 13 through bolts 15, and a circular cylindrical portion 14B formed integrally with the large-diameter cylindrical portion 14A at an axial other side and a tip end side of which is opened. The circular cylindrical portion 14B is arranged to axially extend within the wheel mounting cylinder 18 to be described later. An outer peripheral side of the circular cylindrical portion 14B rotatably supports the wheel mounting cylinder 18 in the side of the rear wheel 7 through wheel support bearings 20 and 21 to be described later.

Here, the spindle 14 has an outer peripheral side formed integrally with an annular flange portion 14C which radially outwardly projects from an intermediate section of the large-diameter cylindrical portion 14A in a length direction (axially) and to which a wet brake 45 is mounted, and with an annular step portion 14D provided to the circular cylindrical portion 14B at an axial one side for axially positioning a one-side retainer 48. A plurality of motor mounting seats 14E are formed integrally to the large-diameter cylindrical portion 14A at an axial one side to radially inwardly project therefrom, and wheel drive motor 16 to be described later is mounted to the motor mounting seats 14E.

On the other hand, an axial other side (tip end side) of the circular cylindrical portion 14B is formed as an open end, and an inner peripheral side thereof is provided with a female spline 14F (refer to FIG. 7) formed thereon. The female spline 14F is spline-coupled to first male spline 51A of a cylindrical coupling member 51 to be described later. Each tooth flank of the male spline 51A is subjected to a modification process (for example, a crowning process). Thereby, the female spline 14F can make a tooth contact of each tooth face with the first male spline 51A uniform in an entire tooth width.

An annular inward projecting portion 14G is formed integrally at an inner peripheral side of an axial intermediate section of the circular cylindrical portion 14B, and a bearing retainer 43 to be described later is mounted to the inward projecting portion 14G through the bolts. A radial hole 14H is formed in the bottom side of the circular cylindrical portion 14B to penetrate and extend therethrough in an upper-lower direction (radial direction of the circular cylindrical portion 14B), and a suction pipe 40 to be described later is inserted into the radial hole 14H.

Figure 2:
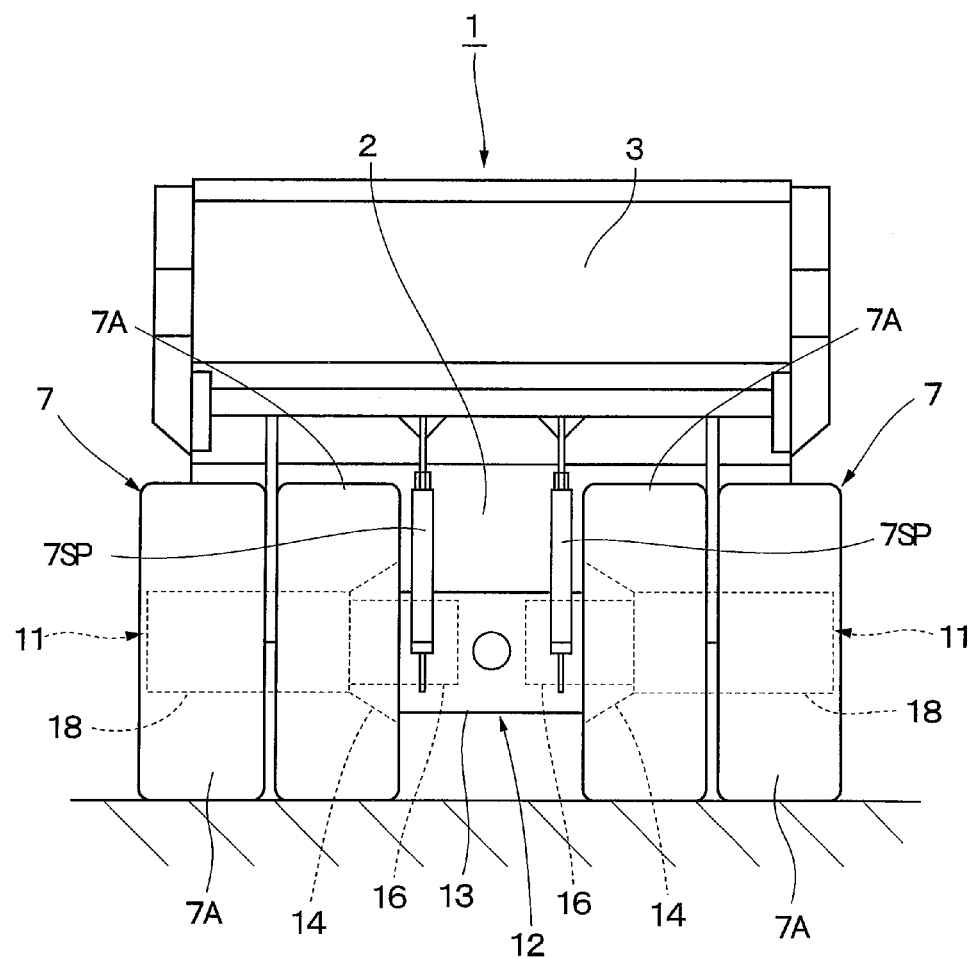
FIG. 2 is a rear view showing the dump truck in FIG. 1 as viewed from the backside.

The wheel drive motor 16 is removably provided in the axle housing 12, and the wheel drive motor 16 is used as a drive source of the rear wheel 7. The wheel drive motor 16 is formed of a large-sized electric motor driven and rotated by power supply from a power generator (not shown) mounted on the vehicle body 2. As shown in FIG. 2, each of the wheel drive motors 16 is respectively mounted within the spindle 14 to be positioned in each of left and right sides of the cylindrical body 13 to drive and rotate the left and right rear wheels 7 independently with each other. The wheel drive motor 16 is provided at an outer peripheral side with a plurality of mounting flanges 16A which are removably mounted to the motor mounting seat 14E of the spindle 14 by using bolts. The wheel drive motor 16 is configured to drive and rotate a rotational shaft 17 by supplying power from the power generator.

The rotational shaft 17 is configured as an output shaft of the wheel drive motor 16 and the rotational shaft 17 is driven and rotated in the forward or backward direction by the wheel drive motor 16. The rotational shaft 17 is formed of a single, elongated, bar-shaped body extending in an axial direction (left and right directions) at the inner peripheral side of the spindle 14 and one end side of the rotational shaft 17 is connected to an output side of the wheel drive motor 16. On the other hand, the other end side of the rotational shaft 17 projects from an open end side of the circular cylindrical portion 14B forming the spindle 14 and to a projecting end of which a sun gear 26 to be described later is mounted. An axial intermediate section of the rotational shaft 17 is positioned between the wheel support bearings 20 and 21 to be described later and is rotatably supported in the spindle 14 by using a rotational shaft bearing 44 to be described later.

Designated at 18 is the wheel mounting cylinder rotating integrally with the rear wheel 7 as a wheel. The wheel mounting cylinder 18 forms a so-called wheel hub, and has the outer peripheral side to which each rim 7B of the rear wheel 7 is removably mounted by using means such as press-fitting. The wheel mounting cylinder 18 is integrally formed as a stepped cylindrical body by a hollow cylindrical portion 18A axially extending between the wheel support bearings 20 and 21 to form a hollow structure, and an extending cylindrical portion 18B axially extending from an outer peripheral end portion of the hollow cylindrical portion 18A to an internal gear 35 to be described later. Accordingly the wheel mounting cylinder 18 is formed as an integral object in a stepped cylindrical shape as a whole.

The internal gear 35 and an outer drum 22 to be described later are integrally fixed to the extending cylindrical portion 18B of the wheel mounting cylinder 18 by using long bolts 23. Therefore the wheel mounting cylinder 18 is rotated integrally with the internal gear 35. That is, rotation of large torque obtained by decelerating the rotation of the wheel drive motor 16 with the reduction gear mechanism 24 is transmitted to the wheel mounting cylinder 18 through the internal gear 35. Therefore, the wheel mounting cylinder 18 rotates the rear wheel 7 as the drive wheel in a vehicle with the large rotational torque.

A rim spacer 19 is formed by a cylindrical ring. The rim spacer 19 is arranged at the outer peripheral side of the wheel mounting cylinder 18 to ensure a predetermined axial gap between an inner tire 7A and an outer tire 7A in the rear wheel 7. That is, as shown in FIG. 3, the rim spacer 19 is sandwiched tightly between a rim 7B in an axial inside and a rim 7B in an axial outside to keep a space therebetween to be axially constant.

Indicated at 20 and 21 are the wheel support bearings for rotatably supporting the wheel mounting cylinder 18 on the outer peripheral side of the spindle 14 and the wheel support bearing 20 and 21 are configured, for example, by using the same tapered roller bearing or the like. The wheel support bearings 20 and 21 are arranged to be spaced axially between the circular cylindrical portion 14B of the spindle 14 and the hollow cylindrical portion 18A of the wheel mounting cylinder 18. That is, the one wheel support bearing 20 is positioned to the annular step portion 14D of the spindle 14 through the one-side retainer 48 to be described later and the other wheel support bearing 21 is positioned to an open end-side outer periphery of the circular cylindrical portion 14B through an end retainer 49 to be described later.

Each inner race of the wheel support bearings 20 and 21 is axially positioned between the retainers 48 and 49 to the circular cylindrical portion 14B of the spindle 14. Each outer race of the wheel support bearings 20 and 21 is axially positioned to the hollow cylindrical portion 18A of the wheel mounting cylinder 18. Therefore, the wheel mounting cylinder 18 is axially positioned to the spindle 14 by using the wheel support bearings 20 and 21 and the retainers 48 and 49, and is supported to the spindle 14 to be rotatable in a circumferential direction thereto.

The outer drum 22 forms a part of the wheel mounting cylinder 18 together with the internal gear 35. As shown in FIG. 3, the outer drum 22 is mounted in a position at an axial outside of the wheel mounting cylinder 18 to sandwich the internal gear 35 to be described later therebetween and is removably fixed to the wheel mounting cylinder 18 by using a plurality of long bolts 23.

Next, an explanation will be made of the reduction gear mechanism 24 provided between the spindle 14 and the wheel mounting cylinder 18.

The reduction gear mechanism 24 is constituted by a first-stage planetary gear reduction mechanism 25 and a final-stage planetary gear reduction mechanism 33 as a second stage, which will be described later. The reduction gear mechanism 24 decelerates rotation of the wheel drive motor 16 (that is, rotational shaft 17), which is transmitted to the wheel mounting cylinder 18 at the side of the rear wheel 7. Therefore, the wheel mounting cylinder 18 at the side of the rear wheel 7 is driven and rotated together with the rear wheel 7 by a large rotational force (torque) obtained by the deceleration.

Denoted at 25 is the first-stage planetary gear reduction mechanism forming the reduction gear mechanism 24 and the first-stage planetary gear reduction mechanism 25 is constituted by the sun gear 26 spline-coupled to the tip end side as a free end of the rotational shaft 17, a plurality (for example, three or four pieces) of planetary gears 28 meshed with the sun gear 26 and a ring-shaped internal gear 27, and a carrier 30 rotatably supporting the respective planetary gears 28 through support pins 29.

Here, the carrier 30 is removably fixed at its outer peripheral side to an open end (an end surface at an axially outside) of the outer drum 22 integrated with the wheel mounting cylinder 18 through bolts, and rotates integrally with the wheel mounting cylinder 18 and the outer drum 22. For example, a disk-shaped lid plate 31 is removably mounted to the inner peripheral side of the carrier 30. The lid plate 31 is removed from the carrier 30, for example, at the time of maintenance or inspection of meshing parts between the sun gear 26 and the planetary gears 28.

The ring-shaped internal gear 27 is formed by using a ring gear to surround the sun gear 26 and the respective planetary gears 28 from a radial outside, and the internal gear 27 is relatively rotatably located as having a narrow radial gap to an inner peripheral surface of the outer drum 22. The rotation (revolving movement) of the internal gear 27 is transmitted to a second-stage planetary gear reduction mechanism 33 through a coupling 32 to be described later.

As the sun gear 26 is rotated integrally with the rotational shaft 17 by the wheel drive motor 16, the first-stage planetary gear reduction mechanism 25 converts the rotation of the sun gear 26 into a rotating movement of each planetary gear 28 and a revolving movement thereof. Further, the rotating movement (rotation) of each planetary gear 28 is transmitted to the ring-shaped internal gear 27 as a decelerated rotation. The rotation of the internal gear 27 is transmitted to the second-stage planetary gear reduction mechanism 33 through the coupling 32 to be described later. On the other hand, the revolving movement of each planetary gear 28 is transmitted to the outer drum 22 in the side of the wheel mounting cylinder 18 by way of rotation of the carrier 30. However, since the wheel mounting cylinder 18 rotates integrally with the second-stage internal gear 35 to be described later, the revolving movement of each planetary gear 28 is suppressed into rotation in synchronization with the internal gear 35 (the wheel mounting cylinder 18).

The coupling 32 rotates integrally with the first-stage internal gear 27 and the coupling 32 is in the form of an annular rotation transmitting member which is located in a position between the first-stage planetary gear reduction mechanism 25 and the second-stage planetary gear reduction mechanism 33. That is, an outer peripheral side of the coupling 32 is spline-coupled to the first-stage internal gear 27. An inner peripheral side of the coupling 32 is spline-coupled to a second-stage sun gear 34 to be described later. Thus, the coupling 32 transmits rotation of the first-stage internal gear 27 to the second-stage sun gear 34 to rotate the sun gear 34 integrally with the first-stage internal gear 27. A plurality of oil holes may be formed in the coupling 32 to circulate lubricant oil 100 to be described later in the front-rear direction (axial direction).

Denoted at 33 is the second-stage planetary gear reduction mechanism as a final stage and the planetary gear reduction mechanism 33 is located between the rotational shaft 17 and the wheel mounting cylinder 18 through the first-stage planetary gear reduction mechanism 25 and decelerates the rotation of the rotational shaft 17 together with the first-stage planetary gear reduction mechanism 25. The second-stage planetary gear reduction mechanism 33 is constituted by the cylindrical sun gear 34 which is mounted coaxially with the rotational shaft 17 and rotates integrally with the coupling 32, a plurality of planetary gears 36 (only one of which is shown in the figure) which are meshed with the sun gear 34 and the ring-shaped internal gear 35, and a carrier 38 which rotatably supports the respective planetary gears 36 through support pins 37.

Here, the second-stage internal gear 35 is formed by using a ring gear to surround the sun gear 34 and the respective planetary gears 36 from a radial outside. The internal gear 35 is integrally fixed between the extending cylindrical portion 18B forming a part of the wheel mounting cylinder 18 and the outer drum 22 by using the long bolts 23. Further, internal teeth formed over the entire periphery on the inner peripheral side of the internal gear 35 are meshed with the respective planetary gears 36.

Figure 4:
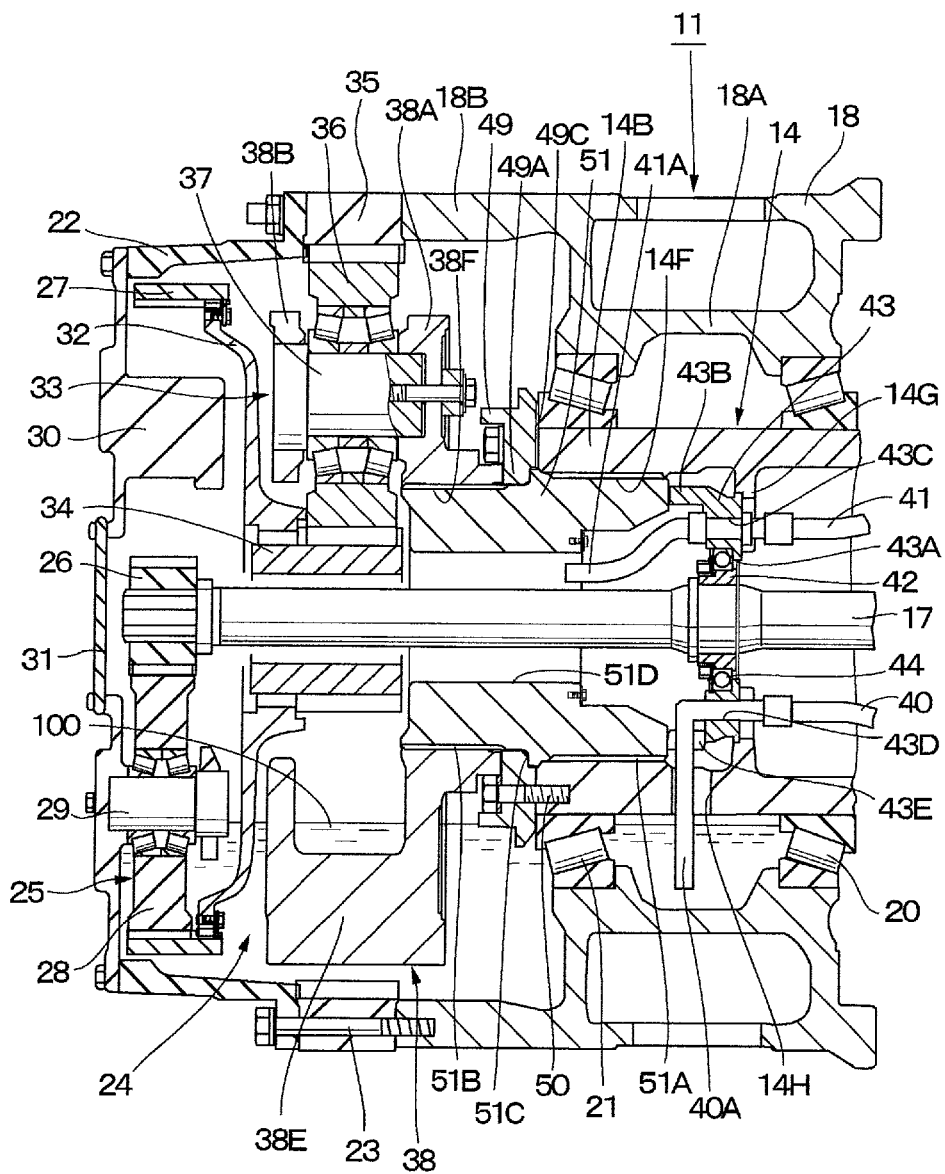
FIG. 4 is an enlarged cross-sectional view showing a planetary gear reduction mechanism, a wheel mounting cylinder, an open side of a spindle, and the like in FIG. 3.
Figure 5:
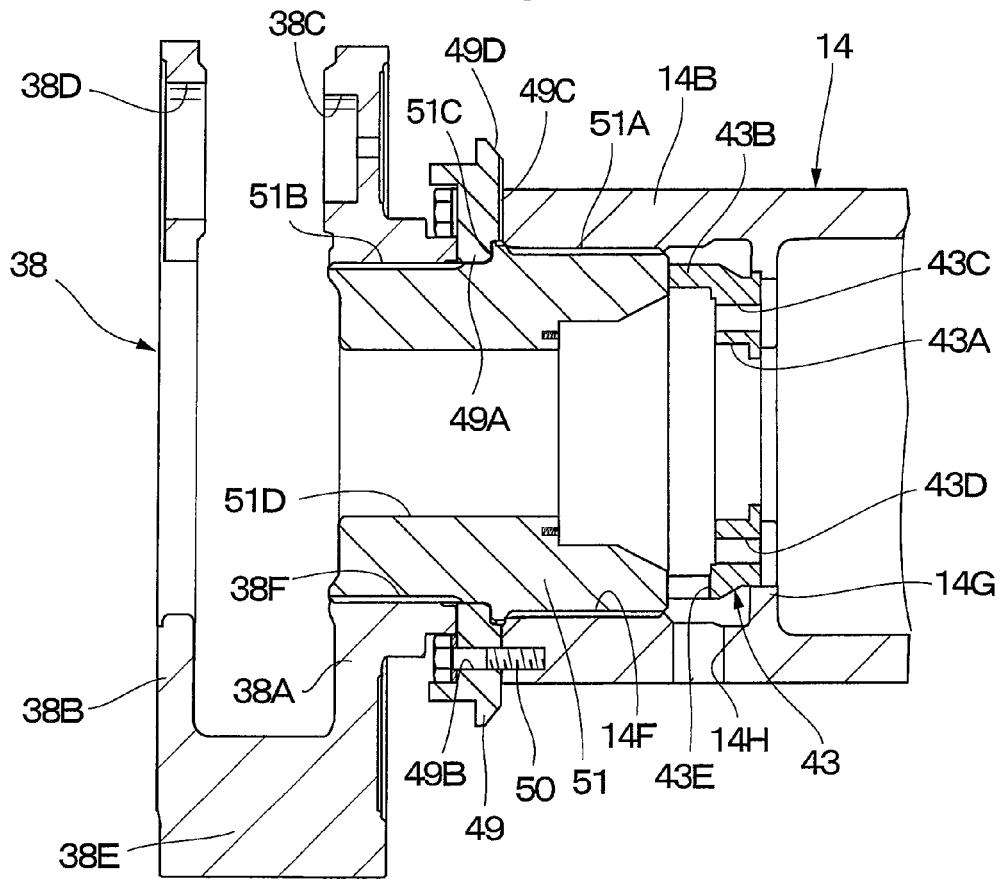
FIG. 5 is a further enlarged cross-sectional view showing a cylindrical coupling member provided between the spindle and a final-stage carrier, and the like in FIG. 4.
Figure 6:
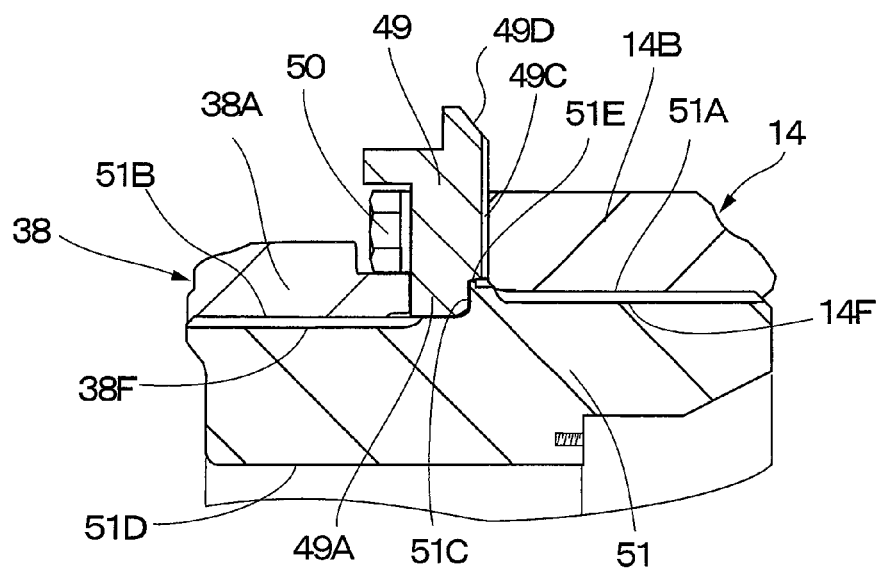
FIG. 6 is a partial, further enlarged cross-sectional view showing an end retainer to prevent the cylindrical coupling member from pulling out of the spindle in FIG. 5.
Figure 7:
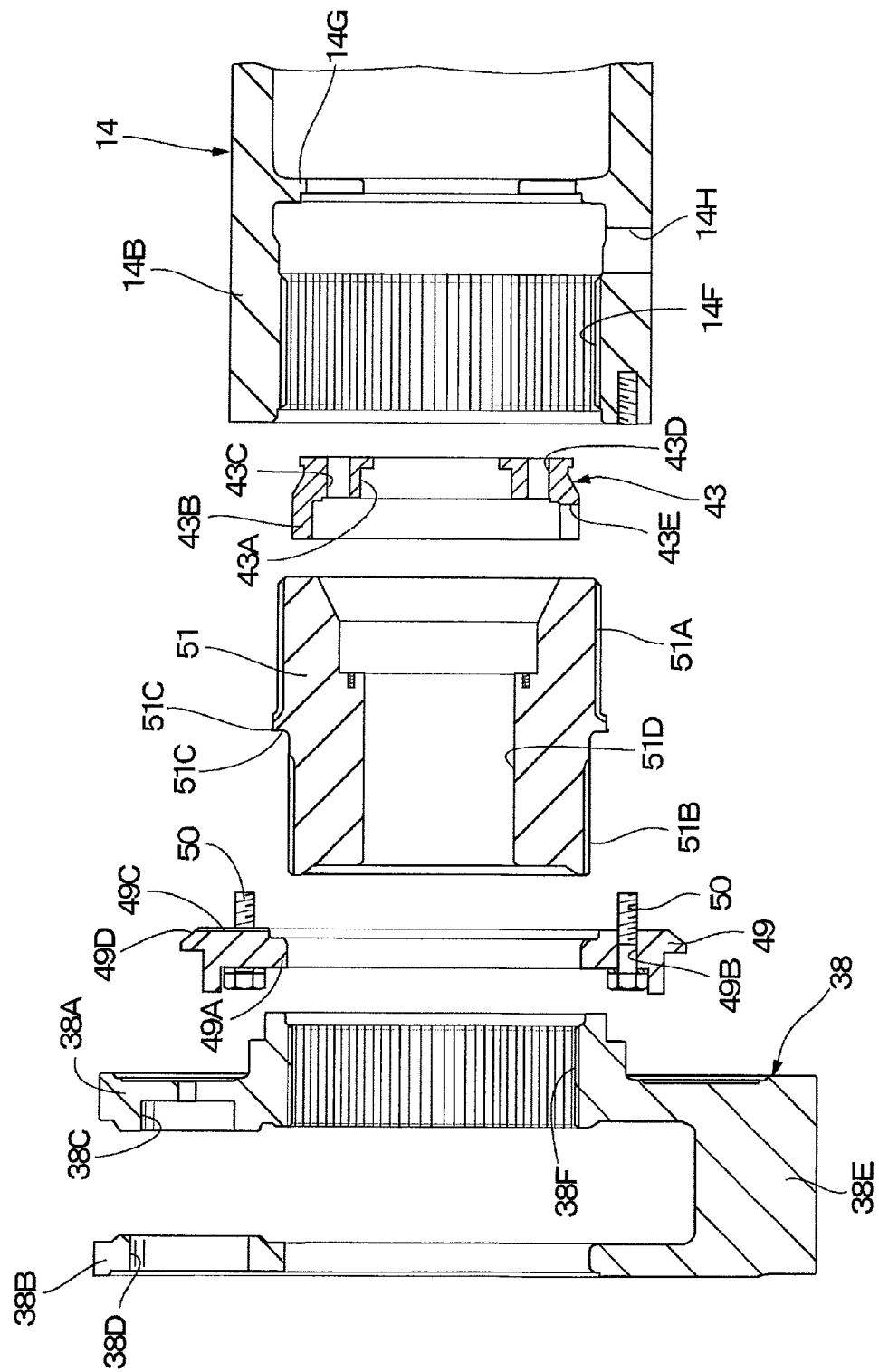
FIG. 7 is an exploded cross-sectional view showing the spindle, the final-stage carrier, the cylindrical coupling member, and the like in FIG. 5.

As shown in FIG. 5 and FIG. 7, the second-stage carrier 38 as a final stage is constituted by including annular support plates 38A and 38B, a plurality of pin mounting hole portions 38C and 38D (only one of each is shown in the figure), and a plurality (for example, three or four pieces) of coupling portions 38E. The annular support plates 38A and 38B are constituted by two plate bodies each having a different plate thickness and are arranged to axially oppose with each other. The pin mounting hole portions 38C and 38D are arranged by constant intervals in the circumferential direction for arranging each planetary gear 36 (refer to FIG. 4) between the support plates 38A and 38B. Both end sides of each support pin 37 are mounted to be fitted in the pin mounting hole portions 38C and 38D. A plurality of coupling portions 38E are arranged to be spaced in the circumferential direction from each pin mounting hole portion 38C and 38D to connect the annular support plates 38A and 38B integrally.

The other female spline 38F is formed on an inner peripheral side of the support plate 38A of the carrier 38. The female spline 38F is spline-coupled to second male splines 51B of a cylindrical coupling member 51 to be described later. Each flank of the second male spline 51B is subjected to a modification process (for example, crowning process). Thereby a tooth contact in each tooth flank between the second male spline 51B and the female spline 38F can be made uniform in an entire tooth width in predetermined torque.

Here, in the second-stage planetary gear reduction mechanism 33, the carrier 38 is spline-coupled to the circular cylindrical portion 14B of the spindle 14 through the cylindrical coupling member 51 to be described later, thereby restraining revolving movements of the respective planetary gears 36 (rotation of the carrier 38). Therefore, as the sun gear 34 rotates integrally with the coupling 32, the second-stage planetary gear reduction mechanism 33 converts the rotation of the sun gear 34 into rotation of each of the planetary gears 36. As a result, the rotation of each of the planetary gears 36 is transmitted to the second-stage internal gear 35, and the internal gear 35 is decelerated for rotation. Therefore, the rotational torque of large output decelerated at the two-stage through the first and second-stage planetary gear reduction mechanisms 25 and 33 is transmitted to the wheel mounting cylinder 18 to which the internal gear 35 is fixed.

Next, a lubricating system for lubricating the reduction gear mechanism 24 will be explained. The lubricating system is constituted by including a partition wall 39, a suction pipe 40, a supply pipe 41, an inner retainer 42, an outer retainer 43, and a rotational shaft bearing 44.

Here, the lubricant oil 100 is reserved inside the wheel mounting cylinder 18, and the respective planetary gear reduction mechanisms 25 and 33 operate in a state where the lubricant oil 100 is supplied all the time. In this case, an oil surface of the lubricant oil 100 is lower than, for example, the lowest section of the circular cylindrical portion 14B forming the spindle 14 and is set in a position where a lower side section of each of the wheel support bearings 20 and 21 is immersed. In consequence, at the operating of the travel drive device 11, the temperature rise of lubricant oil 100 can be restricted by stirring of the wheel mounting cylinder 18 and the respective planetary gear reduction mechanisms 25 and 33, and a stirring resistance of the lubricant oil 100 can be restricted.

The partition wall 39 is provided in the spindle 14. The partition wall 39 is formed of an annular plate and is removably fixed at its outer peripheral side to an inner peripheral side of the large-diameter cylindrical portion 14A of the spindle 14 by using bolts or the like. Here, the partition wall 39 is configured to divide an inside of the spindle 14 into a motor accommodating space portion 39A positioned at its axial one side for accommodating the wheel drive motor 16 and a cylindrical space portion 39B positioned at its axial other side for communicating with the inside of the wheel mounting cylinder 18 all the time.

The suction pipe 40 collects the lubricant oil 100 reserved in the wheel mounting cylinder 18 and the suction pipe 40 has one side in the length direction axially extending within the cylindrical body 13 of the axle housing 12 to be connected to a suction side of a lubricating pump (not shown). An intermediate section of the suction pipe 40 in the length direction axially extends within the spindle 14 toward the side of the wheel mounting cylinder 18. A tip end side 40A (the other side in the length direction) of the suction pipe 40 is bent in an L-letter shape downward from a lower side of the rotational shaft 17 to insert into the radial hole 1411 of the spindle 14. Therefore, the suction pipe 40 is immersed at the tip end side 40A in the lubricant oil 100 in the wheel mounting cylinder 18 to collect the lubricant oil 100 to the side of the lubricating pump.

The supply pipe 41 supplies lubricant oil 100 into the reduction gear mechanism 24. The supply pipe 41 is located above the suction pipe 40 and the rotational shaft 17 in the spindle 14, a tip end side 41A of which is inserted into the cylindrical coupling member 51 to be described later. One side (base end side) in the length direction of the supply pipe 41 is connected to a discharge side of the lubricating pump. The lubricant oil 100 discharged from the lubricating pump is supplied from a tip end side 41A (the other side in the length direction) of the supply pipe 41 toward the cylindrical coupling member 51 to be described later, that is, toward the planetary gear reduction mechanisms 25 and 33.

The lubricant oil 100 reserved in a bottom side of the wheel mounting cylinder 18 is suctioned from a tip end side 40A of the suction pipe 40 by driving the lubricating pump, and the lubricant oil 100 suctioned by the lubricating pump is cooled by an oil cooler (not shown). The cooled lubricant oil 100 is thereafter supplied through the supply pipe 41 to the planetary gear reduction mechanisms 25 and 33, thus lubricating the planetary gear reduction mechanisms 25 and 33.

Indicated at 42 is the inner retainer provided to fit into an axial intermediate section of the rotational shaft 17 and indicated at 43 is an outer bearing retainer located at the outer peripheral side of the inner retainer 42 through the rotational shaft bearing 44. Here, the inner retainer 42 is press-fitted at its inner peripheral side into the intermediate section of the rotational shaft 17 to rotate integrally with the rotational shaft 17. The outer bearing retainer 43 is fixed to an inward projecting portion 14G of the spindle 14 by using a plurality of bolts (not shown).

Figure 8:
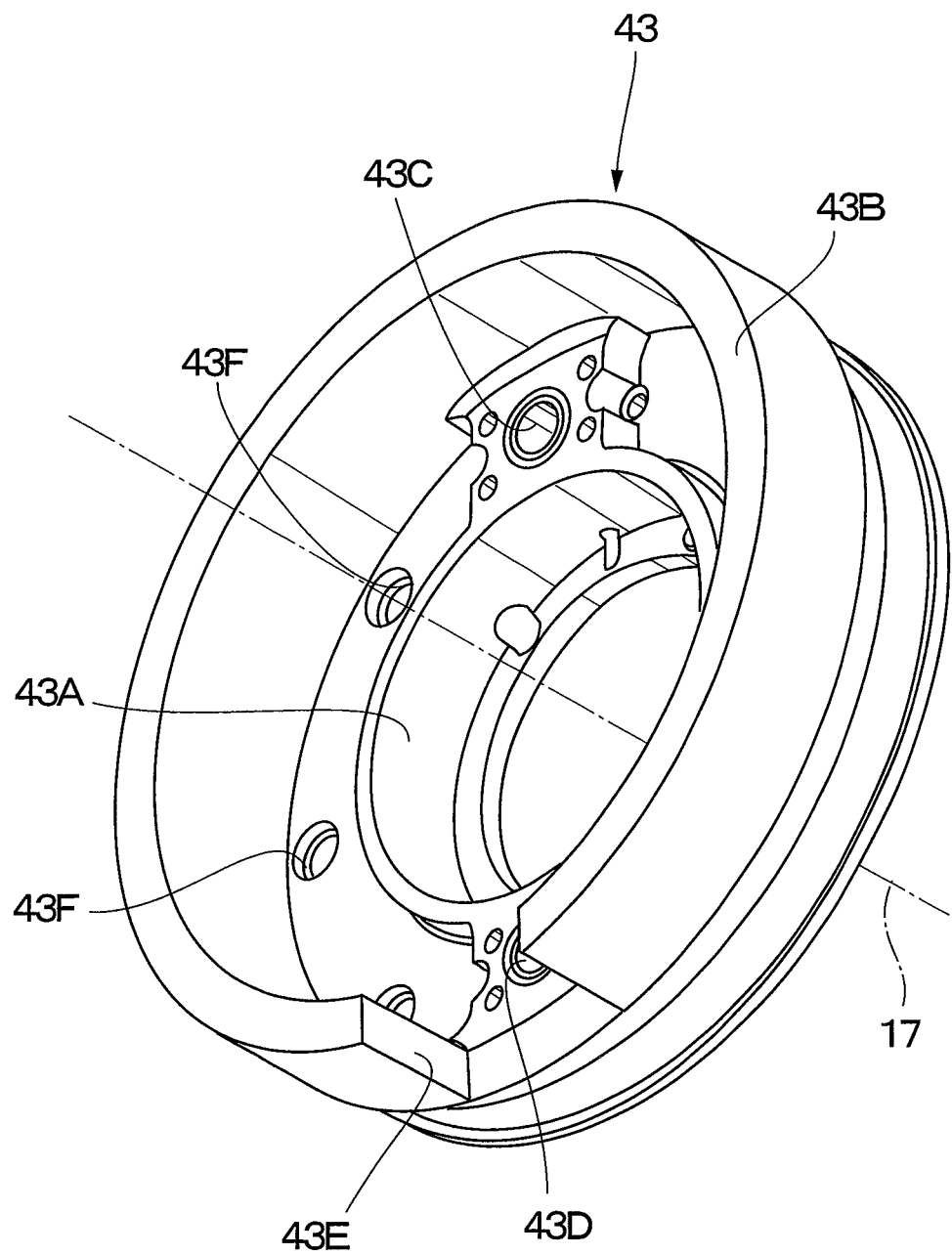
FIG. 8 is an enlarged perspective view showing a bearing retainer in FIG. 7.

As shown in FIG. 7 and in FIG. 8, the bearing retainer 43 is formed as an annular ring body. An outer race mounting portion 43A is mounted on an inner peripheral side of the bearing retainer 43 in a state of preventing the outer race of the rotational shaft bearing 44 from pulling out of the bearing retainer 43. A cylindrical projecting portion 43B is provided on an outer peripheral side of the bearing retainer 43 to project toward an end surface of the cylindrical coupling member 51 to be described later at an axial one side. The cylindrical projecting portion 43B forms part of a positioning projection for axially positioning the cylindrical coupling member 51 inside the circular cylindrical portion 14B of the spindle 14.

The bearing retainer 43 is provided with insert holes 43C and 43D positioned to radially (upper and lower directions in FIG. 5 and in FIG. 7) oppose with each other. The supply pipe 41 is mounted to penetrate through the insert hole 43C. The suction pipe 40 is mounted to penetrate through the insert hole 43D. The bearing retainer 43 is provided with a radial notched portion 43E in a position under the insert hole 43D. The suction pipe 40 is inserted through the notched portion 43E into the radial hole 14H of the spindle 14.

That is, as shown in FIG. 3 and in FIG. 4, mid-sections of the suction pipe 40 and the supply pipe 41 extend to axially penetrate through the bearing retainer 43, so that the suction pipe 40 and the supply pipe 41 are positioned in the spindle 14 through the bearing retainer 43. As shown in FIG. 8, a plurality of bolt through holes 43F are formed in the bearing retainer 43. The bearing retainer 43 is fixed to the inward projecting portion 14G of the spindle 14 by a plurality of bolts (not shown) inserted into the bolt through holes 43F.

The rotational shaft bearing 44 is located between the inner retainer 42 in the side of the rotational shaft 17 and the bearing retainer 43 in the side of the spindle 14. The rotational shaft bearing 44 rotatably supports the axial intermediate section of the rotational shaft 17 through the inner retainer 42 and the outer bearing retainer 43 in the circular cylindrical portion 14B of the spindle 14. Therefore, the core swing in the axial intermediate section of the long rotational shaft 17 can be suppressed, and the long rotational shaft 17 can transmit stable rotation of the rotational shaft 17 to the first-stage sun gear 26.

A wet brake 45 applies braking forces to rotation of the wheel mounting cylinder 18, and the wet brake 45 is constituted by hydraulic brake of a wet multi-plate type. The wet brake 45 is provided through a brake hub 46 to be described later between the spindle 14 in the axle housing 12 and the wheel mounting cylinder 18. The wet brake 45 applies braking forces to the brake hub 46 rotating together with the wheel mounting cylinder 18.

The brake hub 46 forms a part of the wet brake 45 and rotating together with the wheel mounting cylinder 18. The brake hub 46 is formed as a tubular body axially extending between the spindle 14 and the wet brake 45. The axial other side of the brake hub 46 is removably fixed to the hollow cylindrical portion 18A of the wheel mounting cylinder 18 through a plurality of bolts 47.

The one-side retainer 48 positions an inner race of the wheel support bearing 20 to the circular cylindrical portion 14B of the spindle 14. As shown in FIG. 3, the one-side retainer 48 is provided to be fitted into the outer peripheral surface of the circular cylindrical portion 14B. An axial one side of the retainer 48 makes contact with the annular step portion 14D. An axial other side of the one-side retainer 48 axially makes contact with the inner race of the wheel support bearing 20. Therefore, the outer race of the wheel support bearing 20 is axially positioned by the hollow cylindrical portion 18A of the wheel mounting cylinder 18 and the inner race is axially positioned by the one-side retainer 48.

The end retainer 49 is mounted to an end opening side of the spindle 14 through a plurality of bolts 50 and forms part of the other retainer. The end retainer 49 is fixed to the circular cylindrical portion 14B of the spindle 14 and axially positions the inner race of the wheel support bearing 21 with the outer peripheral side of the circular cylindrical portion 14B. That is, the outer race of the wheel support bearing 21 is axially positioned by the hollow cylindrical portion 18A of the wheel mounting cylinder 18 and the inner race is axially positioned by the end retainer 49. Thereby, the wheel mounting cylinder 18 is rotatably supported by the wheel support bearings 20 and 21 in a state of being positioned between the one-side retainer 48 and the end retainer 49.

Figure 9:
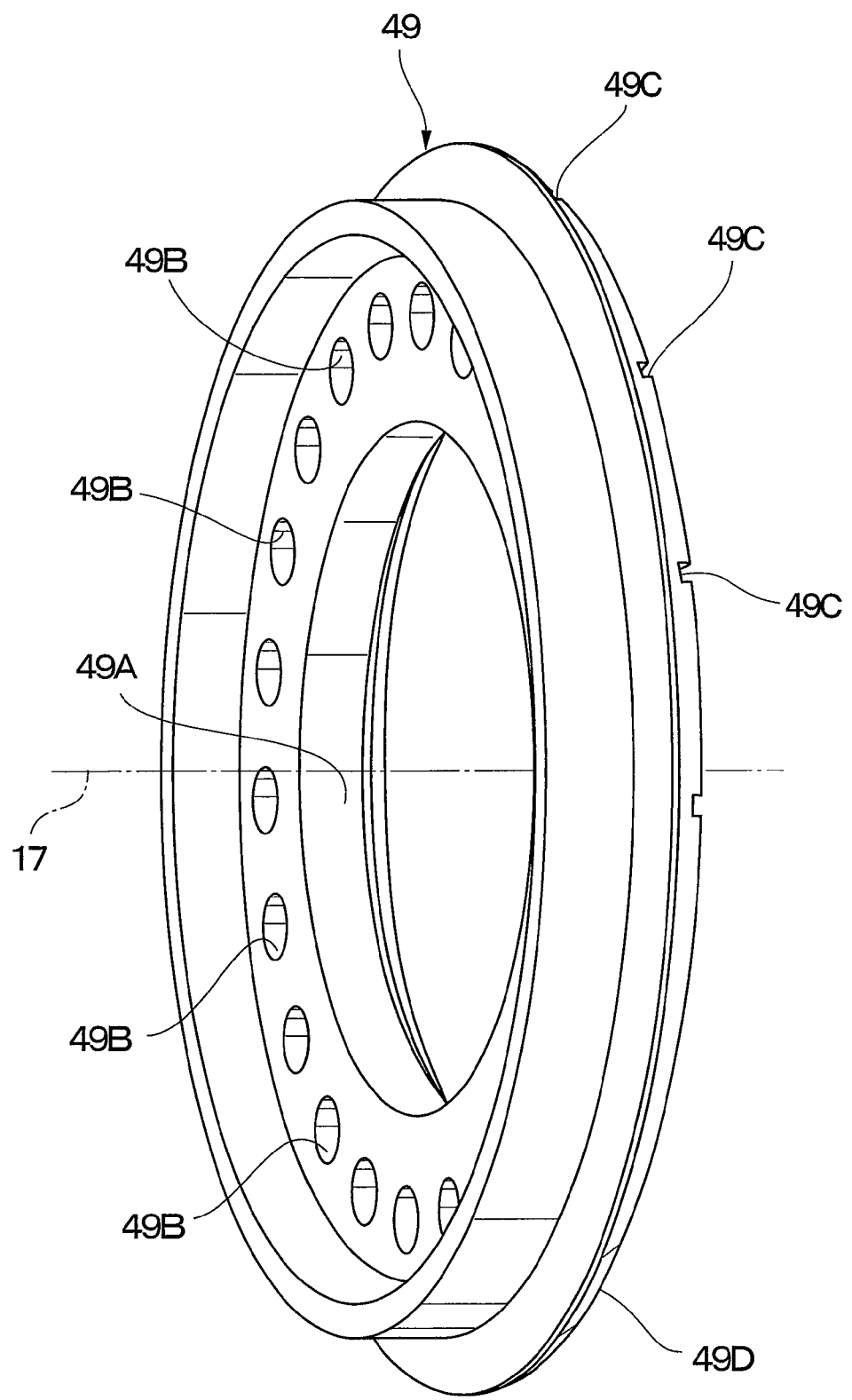
FIG. 9 is an enlarged perspective view showing an end retainer in FIG. 7.

As shown in FIG. 7 and in FIG. 9, the end retainer 49 is formed as an annular ring body. An inner peripheral side of the end retainer 49 is provided with a retaining portion 49A projecting inward in a radial direction in such a manner as to make contact with a step portion 51C of the cylindrical coupling member 51 to be described later. The retaining portion 49A makes surface contact with the annular step portion 51C over the entire circumference for performing an operation of retaining the cylindrical coupling member 51 at the open side of the spindle 14.

A plurality of bolt through holes 49B are bored in the end retainer 49. The end retainer 49 is fixed to the circular cylindrical portion 14B of the spindle 14 by a plurality of bolts 50 inserted into the bolt through holes 49B. On the other hand, the end retainer 49 is provided with oil passages 49C composed of a plurality of recessed grooves formed at an end surface side thereof making contact with the circular cylindrical portion 14B of the spindle 14. The oil passages 49C are positioned to oppose the open side end surface of the circular cylindrical portion 14B and extend from a radial outside to a radial inside to introduce a part of the lubricant oil 100 supplied to the planetary gear reduction mechanism 33 to the male splines 51A and 51B of the cylindrical coupling member 51 side.

Further, a tapered surface portion 49D obliquely inclined is formed on an outer peripheral surface of the end retainer 49. The tapered surface portion 49D collects and guides a part (including oil mists) of the lubricant oil 100 supplied to the planetary gear reduction mechanism 33 toward the oil passage 49C.

Next, the cylindrical coupling member 51 used in the present embodiment will be explained.

That is, the cylindrical coupling member 51 is removably provided between the open side of the spindle 14 and the carrier 38. The cylindrical coupling member 51 is formed as a stepped cylindrical body formed of an independent member independently of the spindle 14 and the carrier 38, and the rotational shaft 17 is inserted with a gap in the inner peripheral side of the cylindrical coupling member 51. In regard to the cylindrical coupling member 51, an outer periphery thereof at one side in an axial direction is spline-coupled to the open end inner peripheral side of the spindle 14 and an outer periphery thereof at the other side in the axial direction is spline-coupled to the inner peripheral side of the carrier 38.

The first male spline 51A positioned in an axial one side and spline-coupled to the female spline 14F of the spindle 14, the second male spline 51B positioned in an axial other side and formed in a diameter smaller than the first male spline 51A to be spline-coupled to the female spline 38F of the carrier 38, and the annular step portion 51C positioned between the first and second male splines 51A and 51B and formed over an entire circumference, are provided on the outer peripheral side of the cylindrical coupling member 51.

Figure 10:
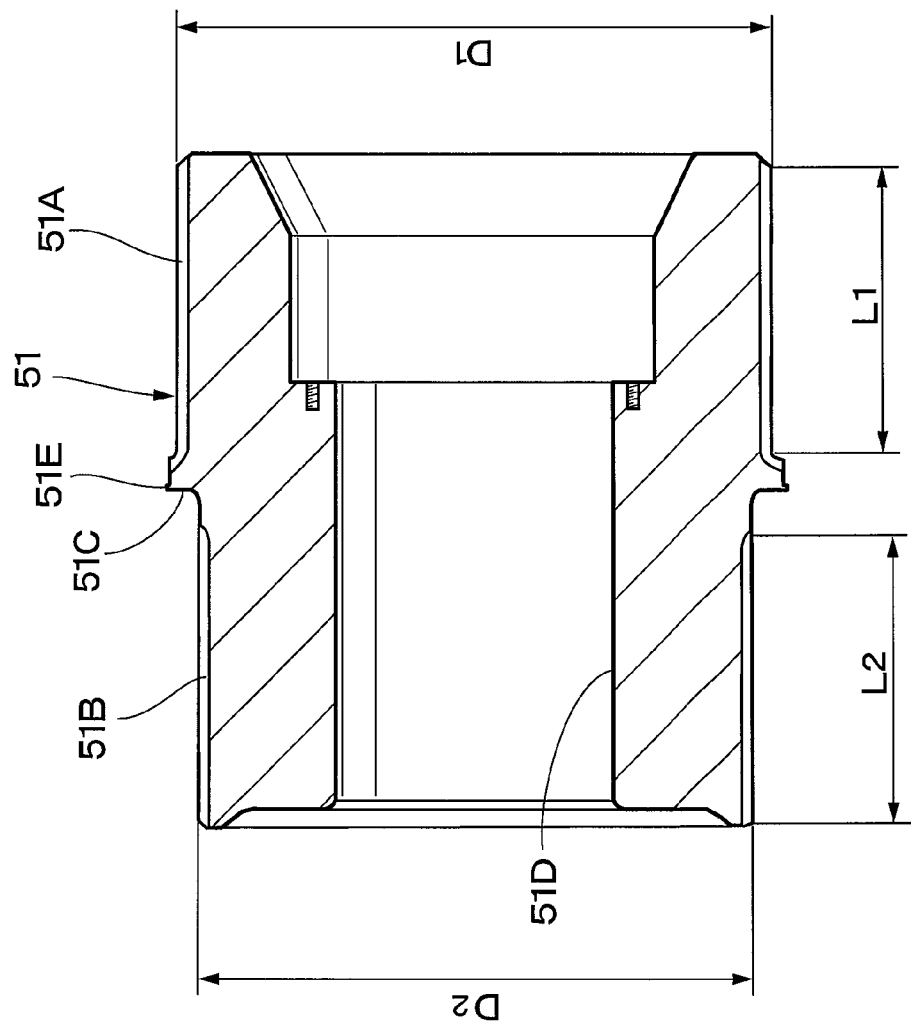
FIG. 10 is an enlarged cross-sectional view showing the cylindrical coupling member in FIG. 7.

As shown in FIG. 10, the first male spline 51A is formed to have a diameter of D1 and a tooth width of L1 as an axial length. A ratio of the diameter D1 to the tooth width L1 (D1/L1) is set in a range of more than 1 and smaller than 2.5 as shown in the following formula 1. Also, in regard to the female spline 14F of the spindle 14 meshing with the first male spline 51A, a ratio of the diameter to the tooth width is set to be similar to that of the first male spline 51A.

$$1 < \frac{D1}{L1} < 2.5 \qquad \text{[Formula 1]}$$

The second male spline 51B is formed to have a diameter of D2 and a tooth width of L2 as an axial length. A ratio of the diameter D2 to the tooth width L2 (D2/L2) is set in a range of more than 1 and smaller than 2.5 as shown in the following formula 2. Also, in regard to the female spline 38F of the carrier 38 meshing with the second male spline 51B, a ratio of the diameter to the tooth width is set to be similar to that of the second male spline 51B.

$$1 < \frac{D2}{L2} < 2.5 \qquad \text{[Formula 2]}$$

A stepped hole 51D is provided on an inner peripheral side of the cylindrical coupling member 51 to have a large diameter at an axial one side and a small diameter at the axial other side. The rotational shaft 17 and a tip end side 41A of the supply pipe 41 are inserted into the stepped hole 51D. Further, an annular guide projection 51E is provided in the cylindrical coupling member 51 to project from an outer peripheral side of the step portion 51C to a radial outside thereof. The guide projection 51E forms part of a lubricant oil guide for guiding the lubricant oil 100 introduced through the oil passage 49C of the end retainer 49 from an outside, toward the first male spline 51A.

The travel drive device 11 for the dump truck 1 according to the present embodiment has the aforementioned configuration, and next, an operation thereof will be explained.

When an operator who gets in the cab 5 of the dump truck 1 activates the engine 8, the hydraulic pump as a hydraulic source is driven and rotated, and electric power is generated by a power generator (any thereof is not shown). At the time the dump truck 1 is driven to travel, the electric power is supplied from the power generator to the wheel drive motor 16, and thereby the wheel drive motor 16 is activated to rotate the rotational shaft 17.

The rotation of the rotational shaft 17 is transmitted from the sun gear 26 of the first-stage planetary gear reduction mechanism 25 to the respective planetary gears 28 in a state of being decelerated, and the rotation of each planetary gear 28 is transmitted through the internal gear 27 and the coupling 32 to the sun gear 34 of the second-stage planetary gear reduction mechanism 33 in a state of being decelerated. In regard to the second-stage planetary gear reduction mechanism 33, the rotation of the sun gear 34 is transmitted to the respective planetary gears 36 in a state of being decelerated. At this time, since the carrier 38 supporting the respective planetary gears 36 is spline-coupled to the circular cylindrical portion 14B of the spindle 14 by using the separated cylindrical coupling member 51, the revolving movements of the respective planetary gears 36 (rotation of the carrier 38) are restricted.

As a result, each of the planetary gears 36 only rotates around the sun gear 34, and rotation decelerated by the rotation of each of the planetary gears 36 is transmitted to the internal gear 35 fixed to the wheel mounting cylinder 18. Thereby, the wheel mounting cylinder 18 rotates with the rotational torque of large output decelerated at the two-stage speed reduction through the first and second-stage planetary gear reduction mechanisms 25 and 33. In consequence, the left and right rear wheels 7 as the drive wheel can be rotated together with the wheel mounting cylinder 18 to drive the dump truck 1 for traveling.

The rotational shaft 17 axially extending from the spindle 14 toward an inside of the wheel mounting cylinder 18 has an axial intermediate section rotatably supported by the inner retainer 42 and the outer bearing retainer 43 through the rotational shaft bearing 44. Therefore, when the rotational shaft 17 rotates in high speeds, the radial torsion or the core swing of the axial intermediate section to be generated due to eccentricity of the rotational shaft 17 can be suppressed at the position of the rotational shaft bearing 44 to enhance durability of the rotational shaft 17.

At the operation of the travel drive device 11, the lubricant oil 100 reserved in the wheel mounting cylinder 18 is stirred upwards in order by rotation of the wheel mounting cylinder 18, the respective planetary gears 28 and 36 in the first and second-stage planetary gear reduction mechanisms 25 and 33. Thereafter, the lubricant oil 100 is supplied to meshing sections of the respective gears, the wheel support bearings 20 and 21 between the circular cylindrical portion 14B of the spindle 14 and the wheel mounting cylinder 18. Subsequently, the lubricant oil 100 flows downwards and is reserved in the bottom side of the wheel mounting cylinder 18.

The lubricant oil 100 accommodated in the bottom side of the wheel mounting cylinder 18 is suctioned up from the tip end side 40A of the suction pipe 40 by the lubricating pump. The lubricant oil 100 is cooled by an oil cooler, and subsequently, is discharged to the side of the supply pipe 41. Therefore, the lubricant oil 100 can be sequentially supplied from the tip end side 41A of the supply pipe 41 toward the reduction gear mechanism 24 (that is, the first and second-stage planetary gear reduction mechanisms 25 and 33) in the wheel mounting cylinder 18.

In a case of decelerating a traveling speed of the dump truck 1 in travel, in some cases the dump truck 1 cannot be sufficiently decelerated simply by decelerating rotation of the wheel drive motor 16. In such a case, an operator of the dump truck 1 depresses the brake pedal to supply a brake pressure (pressurized oil) to the wet brake 45 of a wet multi-plate type. Thereby, the wet brake 45 can apply braking forces to the brake hub 46 rotating integrally with the wheel mounting cylinder 18.

Incidentally, the travel drive device 11 of the dump truck 1 is constituted such that the carrier 38 used for the final-stage planetary gear reduction mechanism 33 is mounted in a non-rotating state on the open end side of the spindle 14, and therefore the carrier 38 and the spindle 14 are connected by a spline-coupling portion. However, this spline-coupling portion used in the conventional art does not necessarily have sufficient strength in a case where a loading weight of the dump truck 1 is increased to, for example, 250 tons or more, and a further improvement on the coupling portion is needed.

Therefore, according to the present embodiment, the cylindrical coupling member 51, which is formed as an independent single member, is provided between the open side of the spindle 14 and the carrier 38, and the spindle 14 and the carrier 38 are spline-coupled by the cylindrical coupling member 51. The cylindrical coupling member 51 is formed as a stepped cylindrical body in a simple shape, wherein the first male spline 51A at the axial one side is spline-coupled to the female spline 14F of the spindle 14 and the second male spline 51B at the axial other side is spline-coupled to the female spline 38F of the carrier 38.

The second male spline 51B has a diameter smaller than that of the first male spline 51A, and the annular step portion 51C is formed between the first male spline 51A and the second male spline 51B to extend over an entire periphery. On the other hand, in regard to the first male spline 51A, a ratio (diameter D1/tooth width L1) is set to a value larger than 1 and smaller than 2.5 in such a manner that a relation between the diameter D1 and the tooth width L1 meets the aforementioned formula 1. In regard to the second male spline 51B, a ratio (diameter D2/tooth width L2) is set to a value larger than 1 and smaller than 2.5 in such a manner that a relation between the diameter D2 and the tooth width L2 meets the aforementioned formula 2.

In the present embodiment, by adopting this arrangement, it is not required to integrally provide the cylindrical projecting portion having the female spline on the outer peripheral side, which is different from the carrier used in the conventional art, and therefore, it is possible to simplify the shape of the carrier 38. On the other hand, since the cylindrical coupling member 51 is a member separated from the spindle 14 and the carrier 38, it can be formed in a simple shape. When the male splines 51A and 51B are formed on the outer peripheral side of the cylindrical coupling member 51, a hob cutter process can be adopted. In addition, in regard to the male splines 51A and 51B, it is easy to execute the modification process to the tooth flank called crowning or relieving for preventing partial contact in the tooth flank.

That is, for enhancing the strength of the spline-coupling portion following a growing size of the travel drive device 11, there may be a measure of increasing the diameters D1 and D2 as outer diameter dimensions of the male splines 51A and 51B or lengthening the tooth widths L1 and L2 (axial length of the spline tooth) thereof. However, it is required for the travel drive device 11 to be made as small in size as possible, and there is a limitation to increasing the diameters D1 and D2 of the male splines 51A and 51B. Therefore the present inventors have considered that the tooth widths L1 and L2 of the male splines 51A and 51B are made as long as possible, thereby reducing a load of each spline tooth per unit length between the male spline 51A and the female spline 14F (the male spline 51B and the female spline 38F).

However, when the tooth widths L1 and L2 of the male splines 51A and 51B are made long, the partial contact in the tooth flank between the spline teeth meshing with each other is highly possible to be generated since an inclination or torsion of the shaft in the cylindrical coupling member 51 tends to be easily generated caused by a rotational load from an outside. Therefore, for preventing the partial contact in the tooth flank between the spline teeth and making the tooth contact therebetween uniform, a modification process of a tooth flank called crowning or relieving is executed in a case of molding the spline tooth.

As a result, in regard to the spline-coupling portion between the first male spline 51A and the female spline 14F, the strength to the rotational load can be enhanced without increasing the diameter D1. That is, in regard to the first male spline 51A and the female spline 14F, the tooth width L1 can be made as long as possible to relive the load of each spline tooth per unit length. In regard to the spline-coupling portion between the second male spline 51B and the female spline 38F also, the strength to the rotational load can be enhanced without increasing the diameter D2. That is, in regard to the second male spline 51B and the female spline 38F, the tooth width L2 can be made as long as possible to relive the load of each spline tooth per unit length.

Further, even when the inclination or torsion of the shaft is generated in the cylindrical coupling member 51 due to the rotational load from an outside, the partial contact in the tooth flank between the spline teeth meshing with each other can be prevented by executing the modification process (crowning or relieving process) of the tooth flank as described above, making the tooth contact uniform in an entire tooth width.

The annular step portion 51C is provided on an axial intermediate section of the cylindrical coupling member 51 to be positioned between the first and second male splines 51A and 51B. A retaining portion 49A is provided on the inner peripheral side of the end retainer 49 positioning the wheel support bearing 21 on the open side end surface of the spindle 14 to make contact with the step portion 51C having a wide contact area. In consequence, the cylindrical coupling member 51 can be mounted on the open end side of the spindle 14 in a retaining state.

On the other hand, the bearing retainer 43 supports the outer race of the rotational shaft bearing 44 in the inner peripheral side of the spindle 14, but the bearing retainer 43 is provided with a cylindrical projecting portion 43B projecting toward an end surface of the cylindrical coupling member 51 at an axial one side. The cylindrical projecting portion 43B makes contact with the end surface of the cylindrical coupling member 51, and thereby the cylindrical coupling member 51 can be axially positioned in the spindle 14.

As a result, the cylindrical coupling member 51 is structured such that the end surface at the axial one side (the first male spline 51A side) makes contact with the cylindrical projecting portion 43B of the bearing retainer 43 and the annular step portion 51C at the axial intermediate section makes contact with the retaining portion 49A of the end retainer 49. In consequence, the cylindrical coupling member 51 can be sandwiched from the axial both sides between the cylindrical projecting portion 43B and the retaining portion 49A. Therefore the cylindrical coupling member 51 can be stably axially retained to the spindle 14 and also can be stop the circumferential rotation, and as a result, can be accurately positioned.

The plurality of oil passages 49C are formed in the end retainer 49, and the oil passage 49C introduces a part of the lubricant oil 100 supplied to the planetary gear reduction mechanism 33 to the outer peripheral side of the cylindrical coupling member 51 to lubricate the side of the first male spline 51A. Therefore the lack of the lubricant oil in the spline-coupling portion between the first male spline 51A and the female spline 14F can be prevented. On the other hand, since the tapered surface portion 49D is formed on the outer peripheral surface of the end retainer 49, the tapered surface portion 49D collects a part (including oil mists) of the lubricant oil 100 supplied to the planetary gear reduction mechanism 33, which is flown down toward the oil passage 49C.

The guide projection 51E as a lubricant oil guide is provided on the outer peripheral side of the step portion 51C in the cylindrical coupling member 51. The guide projection 51E can guide the lubricant oil introduced through the oil passage 49C toward the first male spline 51A having a larger outer diameter dimension out of the first and second male splines 51A and 51B formed on the outer peripheral side of the cylindrical coupling member 51. As a result, the lubricant oil can maintain a state between the first male spline 51A and the female spline 14F to be in a lubricating condition.

In regard to the spline-coupling portion between the second male spline 51B and the female spline 38F of the carrier 38, a state between the tooth flanks of both can be maintained to be in a lubricating condition by oil mists or the like in the lubricant oil 100 generated in the wheel mounting cylinder 18 following the rotation of the wheel mounting cylinder 18 and the rotational movement of each planetary gear 36 on its axis.

Further, even in a case of the large-sized travel drive device 11 in which the outer diameter dimension (for example, diameter D1) of the cylindrical coupling member 51 is 300 mm or more, a ratio of a diameter to a tooth width between the male splines 51A and 51B is set to meet the aforementioned formulas 1 and 2. In consequence, the tooth widths L1 and L2 of the male splines 51A and 51B can be made as long as possible to relieve the load of each spline tooth per unit length.

In addition, the spline-coupling portion between the cylindrical coupling member 51 and the spindle 14, and the spline-coupling portion between the cylindrical coupling member 51 and the carrier 38 can be configured such that each tooth flank is subjected to a crowning or relieving process. In consequence, even in a case where the inclination or torsion of the shaft is generated in the cylindrical coupling member 51 due to the rotational load from an outside, the partial contact in the tooth flank between the spline teeth meshing with each other can be prevented, and a tooth contact of each tooth flank can be uniformed in an entire tooth width.

It should be noted that, each of the aforementioned embodiments is explained by taking a case where the reduction gear mechanism 24 is constituted by the second-stage planetary gear reduction mechanisms 25 and 33, as an example. However, the present invention is not limited to the same, and for example, the reduction gear mechanism may be constituted by a first, third or more-stage planetary gear reduction mechanisms.

Each of the aforementioned embodiments is explained by taking the dump truck 1 of a rear-wheel drive type as an example. However, the present invention is not limited to the same, and it may be applied to, for example, a dump truck of a front-wheel drive type or a four-wheel drive type driving front and rear wheels together.

DESCRIPTION OF REFERENCE NUMERALS

1: Dump truck
2: Vehicle body
3: Vessel
5: Cab
6: Front wheel
7: Rear wheel (Wheel)
8: Engine
9: Hoist cylinder
10: Operating oil tank
11: Travel drive device
12: Axle housing
13: Cylindrical body
14: Spindle
14F: Female spline (Spline-coupling portion)
16: Wheel drive motor (Drive source)
17: Rotational shaft
18: Wheel mounting cylinder
20, 21: Wheel support bearing
22: Outer drum
23: Long bolt
24: Reduction gear mechanism
25, 33: Planetary gear reduction mechanism
38: Carrier
38F: Female spline (Spline-coupling portion)
40: Suction pipe
41: Supply pipe
43: Bearing retainer
43B: Cylindrical projecting portion (Positioning projection)
44: Rotational shaft bearing
45: Wet brake
49: End retainer
49A: Retaining portion
49C: Oil passage
51: Cylindrical coupling member
51A: First male spline (Spline-coupling portion)
51B: Second male spline (Spline-coupling portion)
51C: Annular step portion
51E: Guide projection (Lubricant oil guide)
100: Lubricant oil
D1, D2: Diameter
L1, L2: Tooth width

What is claimed is:

1. A travel drive device for a dump truck comprising:
an axle housing mounted in a non-rotating state on a vehicle body of a dump truck and having an end side opened to form a cylindrical spindle;
a rotational shaft provided to axially extend in said spindle of said axle housing and driven and rotated by a drive source;
a wheel mounting cylinder which is rotatably provided on an outer peripheral side of said spindle through wheel support bearings and to which wheels are mounted; and
a planetary gear reduction mechanism provided between said wheel mounting cylinder and said spindle to decelerate rotation of said rotational shaft, which is transmitted to said wheel mounting cylinder;
wherein a carrier forming a part of said planetary gear reduction mechanism and rotatably supporting a plurality of planetary gears through support pins is mounted in a non-rotating state on an open end side of said spindle,
wherein a cylindrical coupling member, which is formed as a cylindrical body made up of an independent member and in an inner peripheral side of which said rotational shaft is inserted, is provided between said spindle and said carrier, said cylindrical coupling member having an outer periphery of one side in an axial direction that is spline-coupled to an open end inner peripheral side of said spindle and having an outer periphery of another side in the axial direction opposite to said one side that is spline-coupled to an inner peripheral side of said carrier,
wherein one female spline is provided on said open end inner peripheral side of said spindle and another female spline is provided on said inner peripheral side of said carrier, and
a first male spline is provided in said outer periphery of said one side in the axial direction that is spline-coupled to said one female spline of said spindle and a second male spline is provided in said outer periphery of said another side in the axial direction that is spline-coupled to said another female spline of said carrier are provided in said cylindrical coupling member.

2. A travel drive device for a dump truck according to claim 1, wherein an annular step portion positioned between said first and second male splines to extend in a circumferential direction is provided on an outer peripheral side of said cylindrical coupling member,
an end retainer is provided on an open side end surface of said spindle to position said wheel support bearings for rotatably supporting said wheel mounting cylinder on an outer peripheral side of said spindle, and
a retaining portion is provided on an inner peripheral side of said end retainer to make contact with said step portion of said cylindrical coupling member for performing a retaining operation of preventing said cylindrical coupling member from pulling out of said spindle.

3. A travel drive device for a dump truck according to claim 2, wherein said end retainer is provided with an oil passage which is positioned between said end retainer and the open side end surface of said spindle and said oil passage extends in a radial direction, introducing a part of a lubricant oil that is supplied to said planetary gear reduction mechanism to said first and second male splines.

4. A travel drive device for a dump truck according to claim 3, wherein said cylindrical coupling member is provided with a lubricant oil guide for guiding said lubricant oil introduced through said oil passage toward said first male spline.

5. A travel drive device for a dump truck according to claim 1, wherein a rotational shaft bearing rotatably supporting an axial intermediate section of said rotational shaft on an inner race and a bearing retainer supporting an outer race of said rotational shaft bearing to an inner peripheral side of said spindle in a fixing manner are provided inside said spindle, and
said bearing retainer is provided with a positioning projection to project toward an end surface of said cylindrical coupling member in an axial one side and make contact with the end surface, thus axially positioning said cylindrical coupling member inside said spindle.

6. A travel drive device for a dump truck according to claim 1, wherein said cylindrical coupling member has 300 mm or more of a diameter of said first and second male splines, and a ratio of a diameter to a tooth width of each of said splines is set in a range of $$1 < \frac{\text{diameter}}{\text{tooth width}} < 2.5.$$

7. A travel drive device for a dump truck according to claim 1, wherein a spline-coupling portion between said cylindrical coupling member and said spindle and a spline-coupling portion between said cylindrical coupling member and said carrier are configured such that each of tooth flanks is subjected to a crowning or relieving process to make a surface of each tooth of ones of teeth contact each tooth flank uniformly along the tooth surface.

8. A travel drive device for a dump truck according to claim 1, wherein said cylindrical coupling member has 300 mm or more of a diameter of said first and second male splines, and a ratio of a diameter to a tooth width of each of said splines is set in a range of $$1 < \frac{\text{diameter}}{\text{tooth width}} < 2.5,$$

and a spline-coupling portion between said cylindrical coupling member and said spindle and a spline-coupling portion between said cylindrical coupling member and said carrier are configured such that each of tooth flanks is subjected to a crowning or relieving process to make a surface of each tooth of ones of teeth contact of each tooth flank uniformly along the tooth surface.

9. A travel drive device for a dump truck comprising:
an axle housing mounted in a non-rotating state on a vehicle body of a dump truck and having an end side opened to form a cylindrical spindle;
a rotational shaft provided to axially extend in said spindle of said axle housing and driven and rotated by a drive source;
a wheel mounting cylinder which is rotatably provided on an outer peripheral side of said spindle through wheel support bearings and to which wheels are mounted; and
a planetary gear reduction mechanism provided between said wheel mounting cylinder and said spindle to decelerate rotation of said rotational shaft, which is transmitted to said wheel mounting cylinder;
wherein a carrier forming a part of said planetary gear reduction mechanism and rotatably supporting a plurality of planetary gears through support pins is mounted in a non-rotating state on an open end side of said spindle,
wherein a cylindrical coupling member, which is formed as a cylindrical body made up of an independent member and in an inner peripheral side of which said rotational shaft is inserted, is provided between said spindle and said carrier,
said cylindrical coupling member having an outer periphery of one side in an axial direction that is spline-coupled to an open end inner peripheral side of said spindle and having an outer periphery of another side in the axial direction opposite to said one side that is spline-coupled to an inner peripheral side of said carrier,
an annular step portion is provided on an outer peripheral side of said cylindrical coupling member over an entire circumference,
an end retainer is provided on an open side end surface of said spindle to position said wheel support bearings for rotatably supporting said wheel mounting cylinder on an outer peripheral side of said spindle, and
a retaining portion is provided on an inner peripheral side of said end retainer to make contact with said step portion of said cylindrical coupling member for performing a retaining operation of preventing said cylindrical coupling member from pulling out of said spindle.

10. A travel drive device for a dump truck according to claim 9, wherein one female spline is provided on said open end inner peripheral side of said spindle and another female spline is provided on said inner peripheral side of said carrier, and
a first male spline is provided at said outer periphery of said one side in the axial direction that is spline-coupled to said female spline of said spindle and a second male spline is provided in said outer periphery of said another side in the axial direction that is spline-coupled to said another female spline of said carrier are provided in said cylindrical coupling member.

11. A travel drive device for a dump truck according to claim 10, wherein said end retainer is provided with an oil passage which is positioned between said end retainer and the open side end surface of said spindle and said oil passage extends in a radial direction, introducing a part of a lubricant oil that is supplied to said planetary gear reduction mechanism to said first and second male splines.

12. A travel drive device for a dump truck according to claim 11, wherein said cylindrical coupling member is provided with a lubricant oil guide for guiding said lubricant oil introduced through said oil passage toward said first male spline.

13. A travel drive device for a dump truck according to claim 9, wherein a rotational shaft bearing rotatably supporting an axial intermediate section of said rotational shaft on an inner race and a bearing retainer supporting an outer race of said rotational shaft bearing to an inner peripheral side of said spindle in a fixing manner are provided inside said spindle, and
said bearing retainer is provided with a positioning projection to project toward an end surface of said cylindrical coupling member in an axial one side and make contact with the end surface, thus axially positioning said cylindrical coupling member inside said spindle.

14. A travel drive device for a dump truck according to claim 10, wherein said cylindrical coupling member has 300 mm or more of a diameter of said first and second male splines, and a ratio of a diameter to a tooth width of each of diameter said male splines is set in a range of 1<diameter/tooth width<2.5.

15. A travel drive device for a dump truck according to claim 9, wherein a spline-coupling portion between said cylindrical coupling member and said spindle and a spline-coupling portion between said cylindrical coupling member and said carrier are configured such that each of tooth flanks is subjected to a crowning or relieving process to make a surface of each tooth of ones of teeth contact each tooth flank uniformly along the tooth surface.

* * * * *